United States Patent [19]

Regehr et al.

[11] 4,175,938

[45] Nov. 27, 1979

[54] APPARATUS FOR THE SEPARATION OF LIQUID DROPLETS FROM A GAS STREAM ENTRAINING SAME

[75] Inventors: Ulrich Regehr, Susterfeldstr. 65, 5100 Aachen, Fed. Rep. of Germany; Horst Hannemann; Ludwig Speitkamp, both of Aachen, Fed. Rep. of Germany

[73] Assignee: Ulrich Regehr, Aachen, Fed. Rep. of Germany

[21] Appl. No.: 914,780

[22] Filed: Jun. 12, 1978

[30] Foreign Application Priority Data

Jun. 11, 1977 [DE] Fed. Rep. of Germany ....... 2726524

[51] Int. Cl.$^2$ .............................................. B01D 45/04
[52] U.S. Cl. ........................................ 55/440; 55/442
[58] Field of Search ........... 55/257 PV, 257 MP, 440, 55/442–446, 447, DIG. 23; 122/488, 492, 34

[56] References Cited

U.S. PATENT DOCUMENTS

| | | | |
|---|---|---|---|
| 1,956,591 | 5/1934 | Geis | 55/440 |
| 3,899,427 | 8/1975 | Connelly et al. | 55/440 |
| 3,938,972 | 2/1976 | Sugimura | 55/440 |
| 3,977,977 | 8/1976 | Kall | 55/440 |

FOREIGN PATENT DOCUMENTS 1599846 10/1970 France .................................. 55/440

*Primary Examiner*—David L. Lacey
*Attorney, Agent, or Firm*—Karl F. Ross

[57] ABSTRACT

An apparatus for the separation of liquid droplets or fine-particulate solids from a gas stream entraining same in which a plurality of geometrically identical separator plates define flow passages between them for the gas. The plates are formed with corrugations and the crests or troughs of the corrugations are provided with phase-separating chambers open in the direction of the oncoming gas stream. The gas stream entering the gaps at the inlet sides of the phase-separating chambers precipitates the liquid or solids which are conducted downwardly along chambers formed by the phase-separating chambers which are oriented vertically. According to the invention, the successive corrugations (i.e. successive crests or troughs) of each separator plate in the direction of flow are provided with decreasing heights (measured perpendicularly to a median plane through the plate) and the successive corrugations are of decreasing width in the direction of flow of the gas. The inlet gaps to the phase-separating chambers are defined by flanges which extend in the direction of gas flow and serve simultaneously as guide flanges and reverse-blocking members preventing outflow from these chambers.

5 Claims, 4 Drawing Figures

APPARATUS FOR THE SEPARATION OF LIQUID DROPLETS FROM A GAS STREAM ENTRAINING SAME

CROSS-REFERENCE TO RELATED APPLICATIONS

The present invention is related to the commonly owned copending applications Ser No. 889,565 filed Mar. 23, 1978, Ser. No. 792,998 filed May 2, 1977 (now U.S. Pat. No. 4,141,706 of Feb. 27, 1979), Ser. No. 847,671 filed Nov. 1, 1977, and Ser. No. 870,106 filed Jan. 17, 1978 (now abandoned), respectively, and to the earlier applications and patents mentioned therein.

FIELD OF THE INVENTION

The present invention relates to an apparatus for the separation of liquid droplets and/or fine-particulate solids from a gas stream and, more particularly, to a particle separator for gas streams using the direction-change principle.

BACKGROUND OF THE INVENTION

In the aforedescribed copending applications and the earlier applications and patents mentioned therein, there are described flow-direction-change particle separators which operate on inertial principles and wherein the particles entrained by the gas stream are collected in collection or phase-separation chambers formed on corrugated plates which define flow passages for the gas stream between them. Reference may also be had to German published application (Auslegeschrift) DT-AS 22 51 173.

In systems of the aforedescribed type a multiplicity of generally vertically oriented plates define flow passages between them for a gas stream entraining the particles to be recovered, these particles generally being solid or liquid particles, e.g. liquid droplets.

The plates are provided with corrugations which can run vertically and the crests and/or troughs of these corrugations may be formed with phase-separating chambers. The corrugations, generally of trapezoidal cross-section, induce direction changes in the incoming gas stream and the phase-separating or collection chambers have gaps open toward the oncoming gas flow into which the particles to be recovered are entrained by the gas stream and are collected. In the case of a liquid, the collected liquid flows downwardly through these phase-separating or collecting chambers or compartments and can be recovered at the bottom of the apparatus.

For the purposes of the present invention, the term "corrugation" will be used to indicate any undulation in the plates defining the flow passages sufficient to induce a change in direction of the gas stream traversing these passages. In other words the invention is applicable not only to systems of the aforedescribed type in which the corrugations are generally trapezoidal in cross-section or of zig-zag profile, but also to plates which have a generally sinusoidal cross-section or configuration.

In each of the aforedescribed cases, a corrugation crest is formed on one side of the separator plate while the other side is formed with a corrugation trough in the same region. Naturally, since a plurality of corrugations are provided in each plate, on each side of the plate, a trough follows a crest and vice versa. The phase-separating chambers in the systems of the present invention are generally disposed on the outer side of the plate, i.e. upon the crests. However the invention is also applicable to arrangements in which the phase-separating chambers are provided within the troughs, i.e. project from the base of the troughs.

In the conventional construction of such particle separators (see the aforementioned German published application DT-AS No. 22 51 173), the amplitude, the corrugation width and the phase-separating or collecting chamber volumes of the individual separator plates in the flow direction for successive corrugations are the same. The two corrugation widths together define the "wavelength" or pitch of the corrugations.

It has been found in practice that such systems give rise to a pressure drop which is a function of the velocity of the gas stream and for each pressure drop, there is a predetermined separating efficiency or degree of removal of the particulates from the gas.

The degree of separation is not the same for the entire range of fluid or solid particle which is normally encountered in a gas stream and has an upper limit. With higher flow velocities, previously deposited or collected liquid droplets or solid particles which are located in the phase-separating chambers are torn away with the gas stream and carried out of the phase separating chambers thereby. As a consequence, the separating efficiency or degree is limited at higher velocities of the gas.

In order to reduce such re-entrainment of the collected particulate substances, it has been proposed to provide generally U-section collecting channels which are disposed downstream of the phase chambers or collecting chambers and are disposed on a crest downstream of the gas and opening into the flow direction. Such channels serve to recover a portion of the re-entrained materials without reducing the entry gaps for the phase-separating chambers. However, such channels have been found to give rise to an increased pressure drop without a concomitant improvement in the separating efficiency. It is also not possible with such channels to raise the upper limit of the separating efficiency.

OBJECTS OF THE INVENTION

It is an object of the present invention to provide an improved particle separator for the aforedescribed purposes which has a decreased pressure drop for a given separating efficiency, and improved separating efficiency associated with a predetermined pressure drop, and which is effective with high-velocity gases to a greater extent than the earlier systems.

Another object of the invention is to provide an improved particle separator which obviates the disadvantages of the earlier systems described above.

Still another object of the present invention is to provide a particle separator which experiences reduced re-entrainment of the particulate material with high velocity gases.

SUMMARY OF THE INVENTION

These objects and others which will become apparent hereinafter are attained, in accordance with the present invention, in a particle separator for the removal of particles such as liquid droplets and fine-particulate solids, from a gas stream entraining same, the separator having, in the manner described, a plurality of mutually parallel spaced-apart geometrically identical separator plates defining vertical flow passages for the gas streams between them, the flow direction being generally horizontal. In accordance with the earlier principles, moreover, each of the separating plates is corrugated, i.e. provided with a plurality of vertically extending corrugations which induce flow-direction changes in the gas stream traversing each of the flow passages, the corrugations having alternating troughs and crests on the opposite sides of each plate.

The corrugations are also provided with phase-separating chambers open via inlet gaps into the direction of flow.

According to the present invention, the successive corrugation crests (provided with phase-separating chambers) and corrugation troughs of each separator plate in the flow direction are of decreasing amplitude or height, measured perpendicular to a median plane through the respective corrugated plate. According to the invention, moreover, the widths of the corrugation troughs and crests (measured in the flow direction) progressively decreases for the successive corrugations in the flow direction. Additionally, the inlet gaps of the phase-separating chambers are provided with flanges extending generally in the flow direction and reaching into the phase separating chambers to serve as guide flanges defining the inlet gaps and as reverse-flow blocking members.

According to a preferred embodiment of the invention and the best mode currently known for carrying it out in practice, the widths of the phase-separating chambers measured transverse to the main flow direction also decreases along each plate in the direction of flow of the gas stream. The best mode embodiment of the present invention also has, rearwardly of the last phase-separating chamber provided on a crest of a corrugation without a phase-separating chamber in the respective trough, a pair of additional phase-separating chambers one lying in the successive trough while the other is disposed on the crest of the plate formed by this trough.

The particle separator of the present invention has been found to be far more effective than the earlier systems described in recovering particulate materials over a wide range of particle sizes and for a wide range of particle velocities.

The parameters described above, namely, the amplitudes, widths, etc, may be modified for any particular case, i.e. for the specific gas throughputs, flow velocities and requisite separation degree simply by experimentation. It has been found that best results are obtained when each of the separator plates has on one side, two crests and a trough between them, each of the crests being provided with a phase-separating chamber. In this embodiment, the amplitude of the corrugation crests and troughs and their widths should be reduced to between one-third and one-half of the amplitude and width of the first corrugation crest or trough in the gas flow direction and should simultaneously be reduced by one-half to one-fourth of the volume of the first phase-separating chamber to be encountered by the gas stream.

The system of the present invention thus provides flow cross-sections (between the plates) which increase in the direction of flow and which result in reduced pressure drop and decreased velocity progressively in the direction of gas flow.

Surprisingly, in spite of this reduced pressure drop and decreased flow velocity in the gas flow direction, the intensive separation is maintained over a broad particle-size range. Extremely fine droplets and fine-grained solid particles are recovered in the phase-separating chambers. Furthermore, because of the decreased flow velocity and the associated Bernoulli change in pressure, previously deposited liquid or solid materials are no longer re-entrained and thus the system is highly suitable with use with high gas velocities.

BRIEF DESCRIPTION OF THE DRAWING

The above and other objects, features and advantages of the present invention will become more readily apparent from the following description, reference being made to the accompanying drawing in which.

SPECIFIC DESCRIPTION

Figure 4:
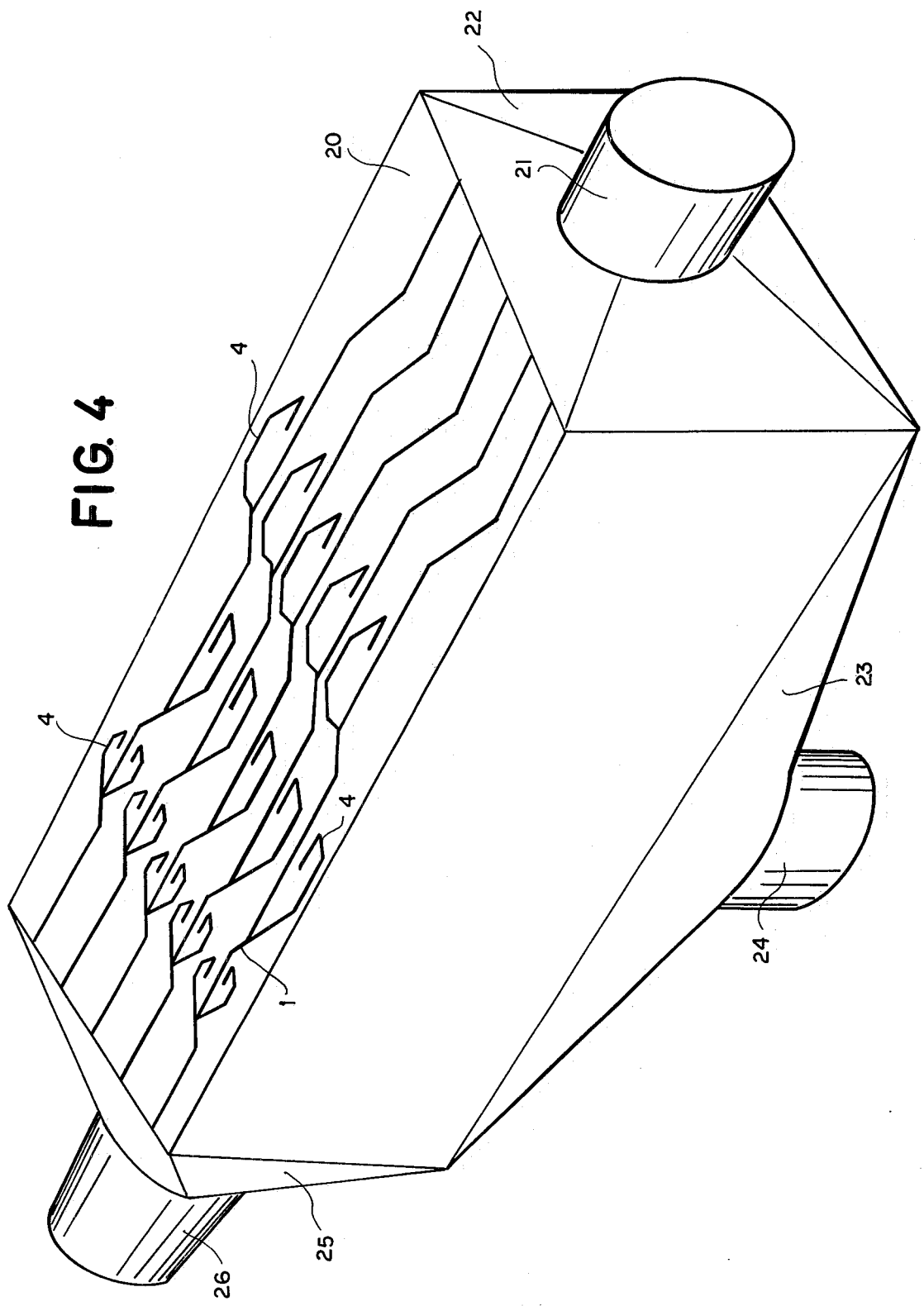
FIG. 4 is a perspective view through an apparatus of the present invention partly broken away.

Referring first to FIG. 4, it can be seen that a particle separator of the type of the present invention can comprise a set of separator plates 1 (see FIG. 1) disposed in a housing 20 and adapted to be traversed by a gas stream entraining liquid droplets or solid particles and introduced at high velocity through an inlet duct 21 in one end wall 22 of the housing. The gas is discharged through the opposite end wall 25 via a duct 26 connected thereto.

At the bottom of the housing, there is a collecting hopper 23 for the separated material which can be discharged via a duct 24.

Figure 1:
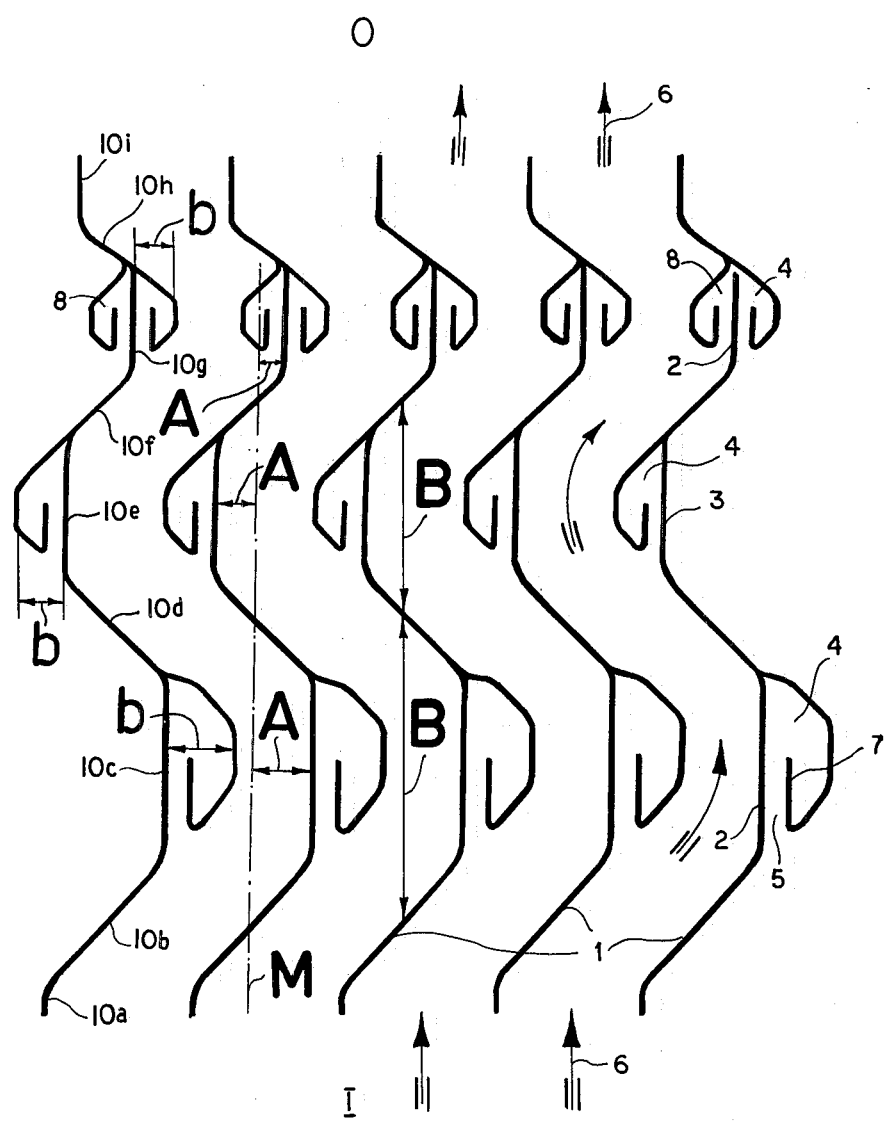
FIG. 1 is a cross-sectional view taken in the direction of flow of a gas stream through a set of separator plates for an apparatus embodying the present invention.

FIG. 1 shows a set of separator plates, in accordance with the present invention, which can be used in the apparatus of FIG. 4.

The set of separator plates 1 which can serve for the recovery or collection of liquid droplets or fine-particulate solids from a gas stream, has an inlet side I and an outlet side O. Each of the plates 1 is corrugated with a plurality of crests 2 and troughs 3 succeeding one another in the direction of gas flow as represented by the arrow 6. In the regions of the crests 2, phase-separating chambers 4 are provided which can have the configuration of FIG. 2 (integral with the plate and unitarily formed thereon) or the configuration of FIG. 3 in which these phase separating chambers are attached, e.g. by welding, to the plates. The phase-separating chambers 4 form relatively narrow inlet gaps 5 (with respect to the width of the phase-separating chamber) which open toward the oncoming gas stream, i.e. in the direction opposite that of arrow 6.

In the preferred embodiment (best mode) of the invention, the corrugated plates have generally trapezoidal corrugations (as seen in cross-section) although the plates can also be generally sinusoidal in cross-section or of a zig-zag configuration provided that crests and troughs succeed one another in the manner described.

In this best mode embodiment of the invention, moreover, at the inlet side of the set of plates, each plate 1 has an inlet edge 10a which extends parallel to the direction of the flow of the incoming gas stream (i.e. parallel to arrow 6), followed by a flank 10b of the first corrugation which bends to the right to deflect the gas stream correspondingly. The flank 10b is followed by a flank 10c which is again parallel to the inlet edge 10a and forms, on one side of the plate, the roof of the crest and on the opposite side of the plate, the floor of a trough. The crest-roof 10c defines the inlet gap 5 with a flange 7, to be described to a greater extend below, of the first phase-separating chamber 4.

The plate portion 10c is also parallel to the median plane M of the plate which extends in the general direction of flow (arrow 6) and to the opposite sides of which the crests and troughs are formed.

In the direction of flow, the plate portion 10c is followed by a flank 10d bent to the left for deflecting the gas stream in the opposite direction of that induced by the flank 10b. The flank 10d leads into a wall portion 10e which is parallel to the wall portion 10c and to the median plane M of the next trough 3 of smaller amplitude as will be described below. Here again, the wall portion 10e forms on the left side, the roof of a crest which is provided with the second phase-separating chamber 4 of the given plate.

The plate portion 10e is followed by a flank 10f, again bent to the right which leads to a plate portion 10g parallel to the plate portions 10e and 10c and to the median plane M. This wall portion 10g on the same side as the plate portion 10c, is provided with the last phase-separating chamber 4.

The plate portion 10g is followed by still another inclined plate portion or flank 10h and the latter terminates in a planar edge portion 10i along the discharge side O of the set of plates.

Figures 2, 3:
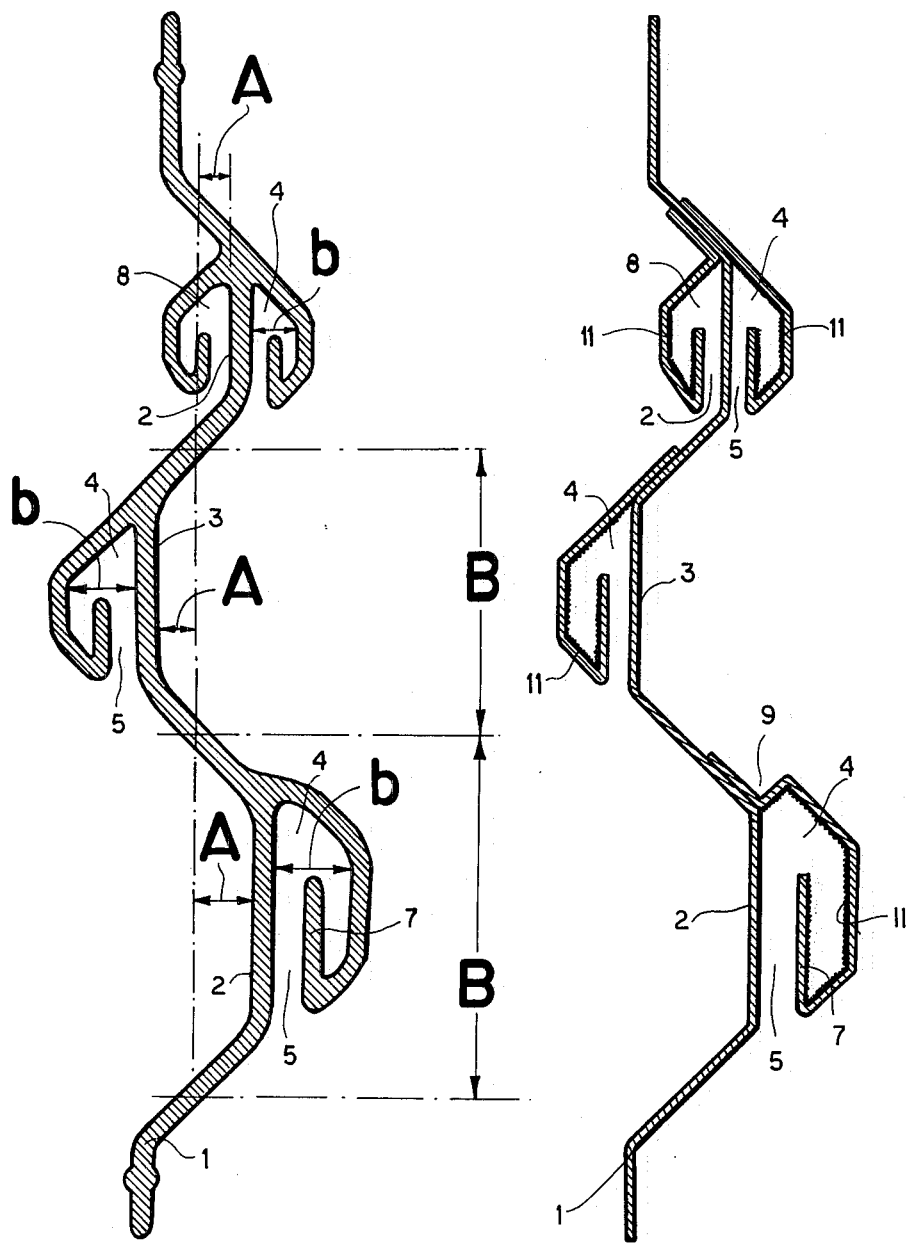
FIG. 2 is a cross-sectional view through a single separator plate which can be used in the set of FIG. 1.
FIG. 3 is a cross-sectional view through a plate similar to FIG. 2 but representing an alternative embodiment of the invention.

As is especially apparent from FIGS. 2 and 3, the successive crests 2 and successive troughs 3 of each separator plate 1 have a decreased amplitude A measured perpendicular to the median plane M.

In addition, also in the flow direction, the widths of the successive corrugations, i.e. the successive troughs and crests, decreases.

According to the invention, moreover, the inlet gaps 5 of the phase-separating chambers 4 are defined between the crest-forming plate portions 10c, 10e, or 10g of the respective plate and by flanges 7 which act as re-entrant members parallel to these plate portions and constitute simultaneously guide flanges for the incoming gas stream and particles and as back-flow blocking members preventing the particulate material from being drawn out of the phase-separating chambers.

Furthermore, the widths b of the phase-separating chambers measured perpendicular to the median plane M and hence to the main flow direction 6 progressively decrease in the direction of flow of the gas through the flow passages.

The last phase-separating chamber 4 (top in FIGS. 2 and 3) is provided upon a corrugation crest whose trough, in accordance with the principles of the present invention, receives a further phase-separating chamber 8 so that, in the last corrugation of the plate, a double chamber is provided. This additional phase-separating chamber has been found to be extremely useful when very fine liquid droplets or solid particles must be recovered.

FIGS. 2 and 3 show the plates in the best-mode embodiments of the invention, i.e. with, on one side of each plate, two corrugation crests 2 and one corrugation trough 3 between the two corrugation crests. The opposite side of each plate has two corrugation troughs 3 and a corrugation crest 2 between them.

In this configuration, the amplitude A of the corrugation crests 2 and troughs 3 and their widths B in the flow direction can be reduced to about one-third or one-half of the amplitude A and width B of the first corrugation crest 2 and the first trough 3. The volumes of the phase-separating chambers 4 can be reduced in the flow direction to one-half to one-quarter of the volume of the first phase-separating chamber.

According to the invention, moreover, the phase-separating chambers 4 can be provided internally with roughened surfaces, flocking, grooves or the like as represented at 11 to further reduce the possibility of re-entrainment of the particulate matter. Such roughened surfacing can be formed on all of the internal walls of the guide flange 7 and the other walls of the phase-separating chambers as particularly illustrated in FIG. 3.

FIGS. 2 and 3 also indicate that the inlet gaps 5 to the phase-separating chambers which are defined by the flanges 7, can also decrease from phase-separating chamber to phase-separating chamber in the direction of flow. This has been found to be especially important. In addition, a runoff channel 9 can be provided behind the first phase-separating chamber 7 as has been illustrated for FIG. 3.

We claim:

1. An apparatus for the removal of particles from a gas stream entraining same, said apparatus comprising a housing having an inlet and an outlet and traversed by said stream from said inlet to said outlet, and a multiplicity of separator plates in said housing defining flow passages between them, said flow passages being traversed by said gas stream in a flow direction from said inlet to said outlet, each of said plates being corrugated and having, at least on one side of each plate, alternating corrugation crests separated by a corrugation trough with the crests and troughs of the plates extending transversely to said direction, at least the corrugation crests of said plates being provided with members overhanging the respective crest and defining respective phase-separating chambers having inlet gaps opening into the oncoming gas stream opposite to said direction, the successive crests and troughs of each of said plates away from said inlet toward said outlet having a progressively decreasing amplitude measured perpendicular to a median plane of the respective plate, the trough and crest widths of succeeding troughs and crests in said direction progressively decreasing for each plate, the inlet gaps of each of said phase-separating chambers being formed by a flange extending generally in said direction and into the respective phase-separating chamber to serve as a guide flange and reverse-flow blocking member.

2. The apparatus defined in claim 1 wherein the widths of the phase-separating chambers measured transversely to said median plane progressively decreases for each plate in said direction.

3. The apparatus defined in claim 1 wherein the last corrugation of said plate in said direction is formed on one side with a crest having a phase-separating chamber and in the trough on the opposite side of the respective plate with another phase-separating chamber having an inlet gap opening toward the oncoming gas stream.

4. The apparatus defined in claim 1 wherein each of said plates has on one side a pair of crests spaced apart by a trough and the opposite side a pair of troughs spaced apart by a crest, the amplitude of the crests and troughs diminishing in said direction to about one-third to one-half of the amplitude and width of the corrugation trough and crest located closest to said inlet.

5. The apparatus defined in claim 4 wherein the volumes of the phase-separating chambers of each of said plates diminish to about one-half to one-fourth the volume of the phase-separating chamber located closest to said inlet.

* * * * *